(12) United States Patent
Okamura et al.

(10) Patent No.: US 10,464,554 B2
(45) Date of Patent: Nov. 5, 2019

(54) VEHICLE CONTROLLER

(71) Applicant: TOYOTA JIDOSHA KABUSHIKI KAISHA, Toyota-shi, Aichi-ken (JP)

(72) Inventors: Ryuji Okamura, Gotemba (JP); Shinya Sannodo, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 72 days.

(21) Appl. No.: 15/794,450

(22) Filed: Oct. 26, 2017

(65) Prior Publication Data
US 2018/0126982 A1  May 10, 2018

(30) Foreign Application Priority Data
Nov. 8, 2016 (JP) .................... 2016-217955

(51) Int. Cl.
*B60W 10/06* (2006.01)
*B60W 30/06* (2006.01)
(Continued)

(52) U.S. Cl.
CPC ............. *B60W 30/06* (2013.01); *B60W 10/06* (2013.01); *B60W 30/08* (2013.01); *B60W 30/18018* (2013.01); *B60W 30/18027* (2013.01); *B60W 30/18036* (2013.01); *B60W 30/18045* (2013.01); *B60W 2510/1005* (2013.01);
(Continued)

(58) Field of Classification Search
CPC ........... B60W 30/08; B60W 30/18018; B60W 30/18027; B60W 30/18069; B60W 30/18045; B60W 10/06; B60W 2710/0666; B60W 30/06; B60W 2540/10; B60W 2720/106; B60W 2550/10;
(Continued)

(56) References Cited

U.S. PATENT DOCUMENTS 6,185,494 B1 * 2/2001 Wadas ................. B60W 10/06
477/115
8,630,774 B2 * 1/2014 Holub ..................... F16H 61/12
701/51

(Continued)

FOREIGN PATENT DOCUMENTS

JP     05-272632 A    10/1993
JP   2010-025160 A    2/2010
(Continued)

*Primary Examiner* — Roger L Pang
(74) *Attorney, Agent, or Firm* — Sughrue Mion, PLLC

(57) ABSTRACT

A vehicle controller configured to control a vehicle which includes a transmission gear includes at least one electronic control unit. The at least one electronic control unit is configured to: determine whether a shift range of the transmission gear is switched such that the vehicle travels in a changed traveling direction not based on a shift range switching operation by an occupant of the vehicle; and limit, when it is determined that the shift range is switched such that the vehicle travels in the changed traveling direction not based on the shift range switching operation, a driving force of the vehicle such that the driving force of the vehicle is smaller than when it is determined that the shift range is not switched such that the vehicle travels in the changed traveling direction not based on the shift range switching operation.

5 Claims, 8 Drawing Sheets

(51) Int. Cl.
  *B60W 30/18* (2012.01)
  *B60W 30/08* (2012.01)
(52) U.S. Cl.
  CPC ..... *B60W 2540/10* (2013.01); *B60W 2550/10* (2013.01); *B60W 2710/0666* (2013.01); *B60W 2720/10* (2013.01); *B60W 2720/106* (2013.01); *Y10T 477/679* (2015.01); *Y10T 477/68* (2015.01)
(58) Field of Classification Search
  CPC ...... B60W 2510/1005; B60W 2720/10; Y10T 477/679; Y10T 477/68
  See application file for complete search history.

(56) References Cited

U.S. PATENT DOCUMENTS

| | | | |
|---|---|---|---|
| 9,205,838 B2 * | 12/2015 | Moore | B60W 10/06 |
| 9,771,061 B2 * | 9/2017 | Tabata | B60W 10/115 |
| 2009/0211831 A1 * | 8/2009 | Takamatsu | B60K 28/06 |
| | | | 180/272 |
| 2011/0112736 A1 | 5/2011 | Nakade et al. | |
| 2014/0025267 A1 | 1/2014 | Tezuka et al. | |
| 2016/0229452 A1 * | 8/2016 | Lavoie | B62D 13/06 |

FOREIGN PATENT DOCUMENTS

| | | | |
|---|---|---|---|
| JP | 2014-019295 A | 2/2014 | |
| JP | 2014-184746 A | 10/2014 | |

* cited by examiner

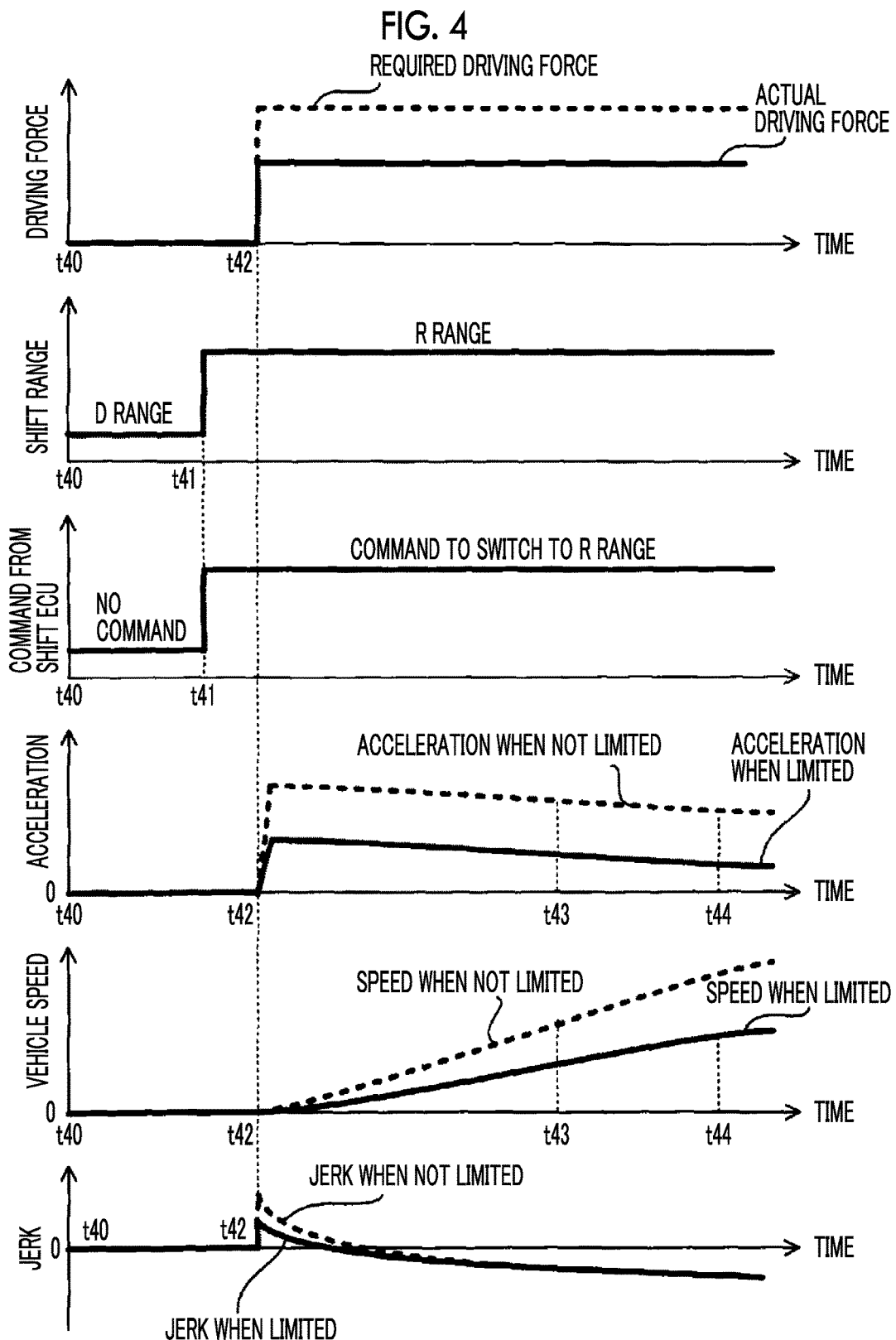

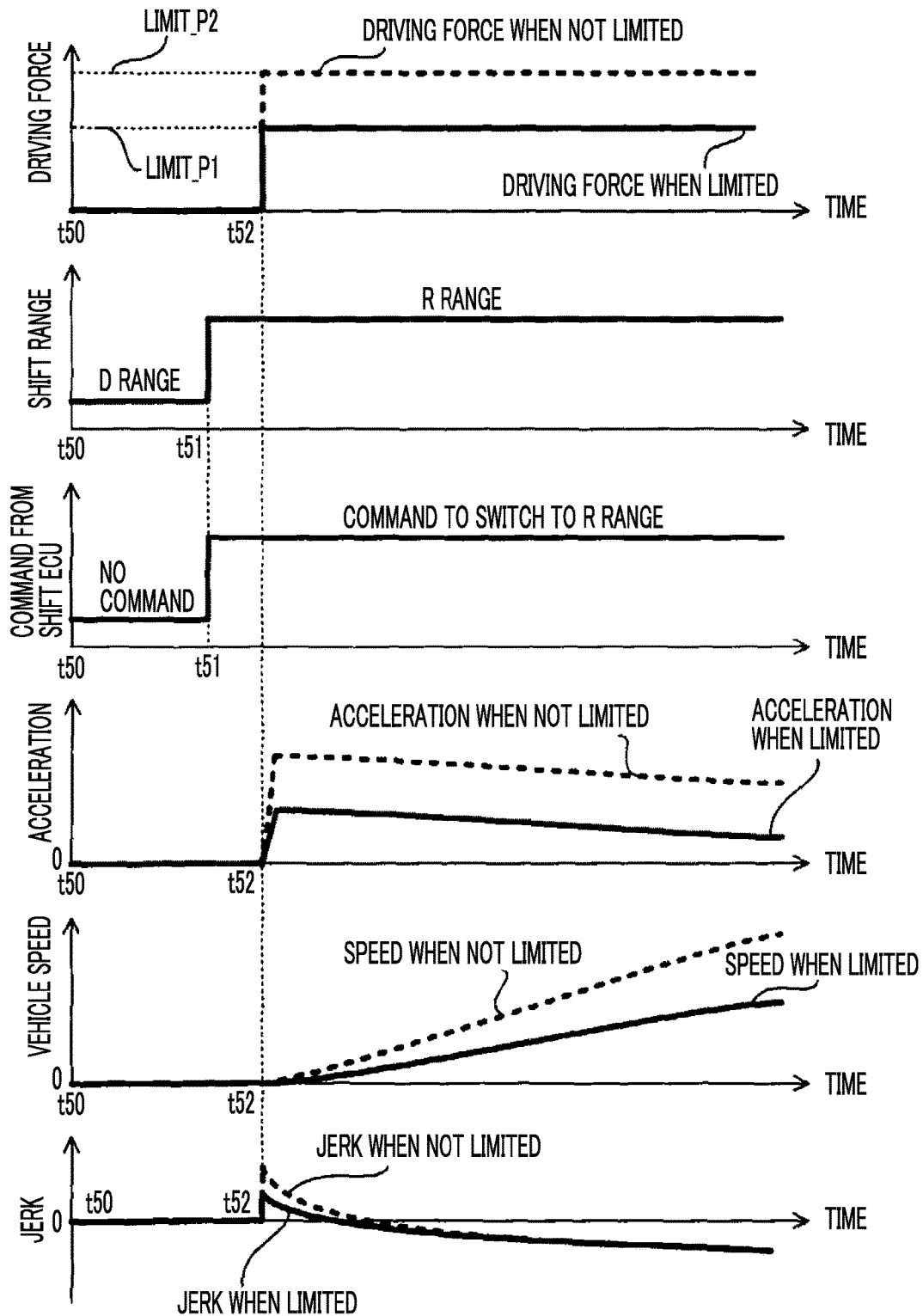

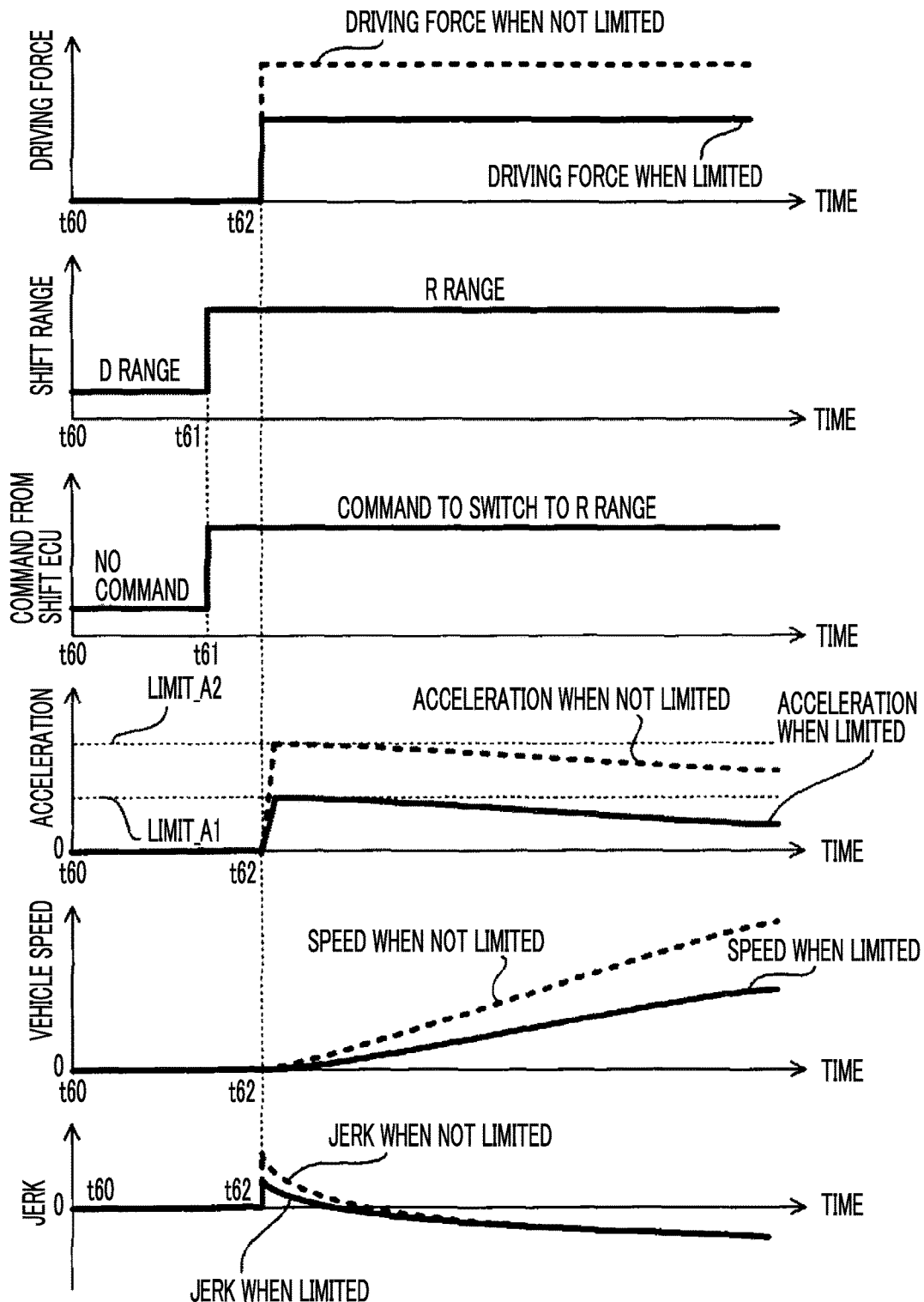

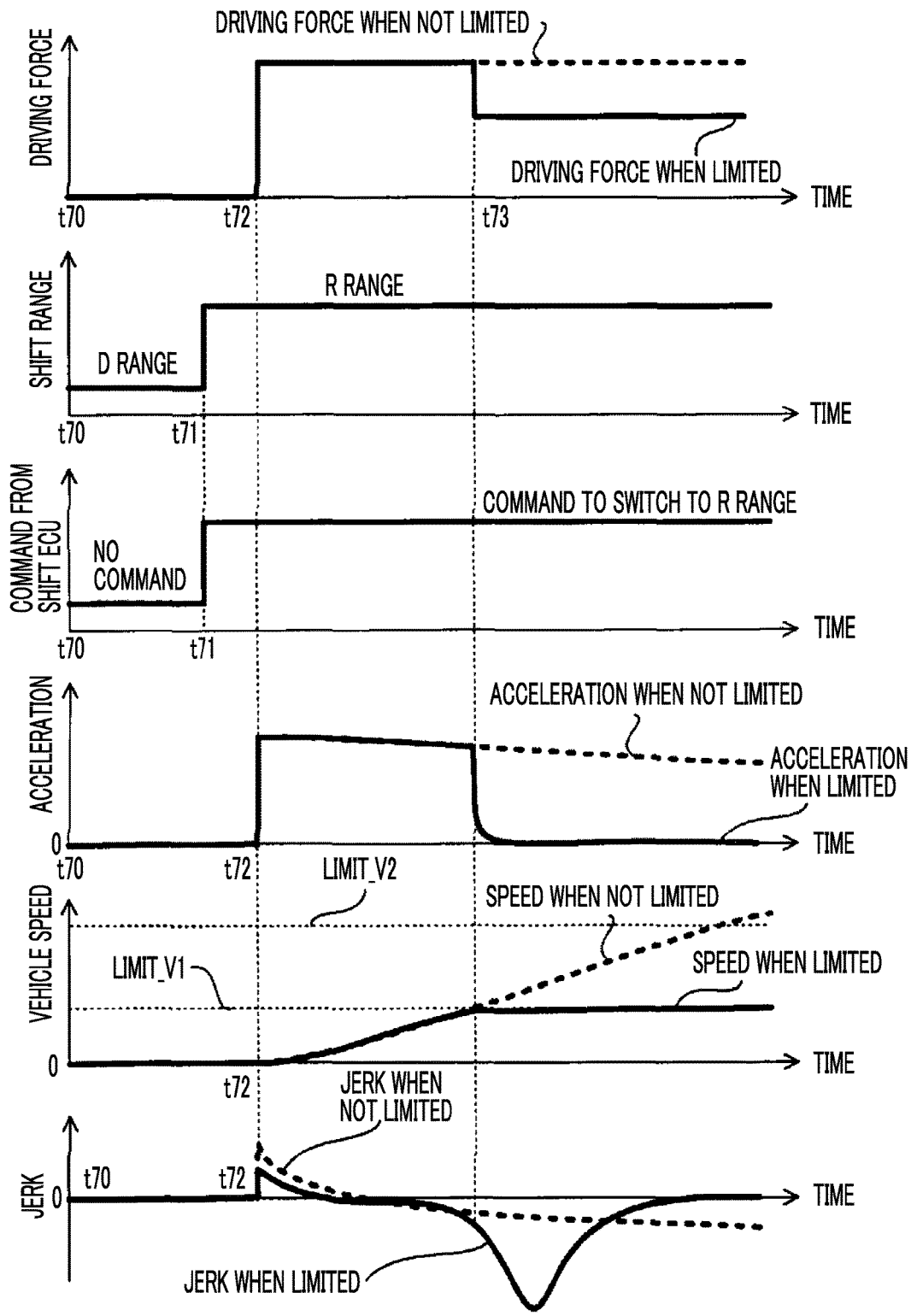

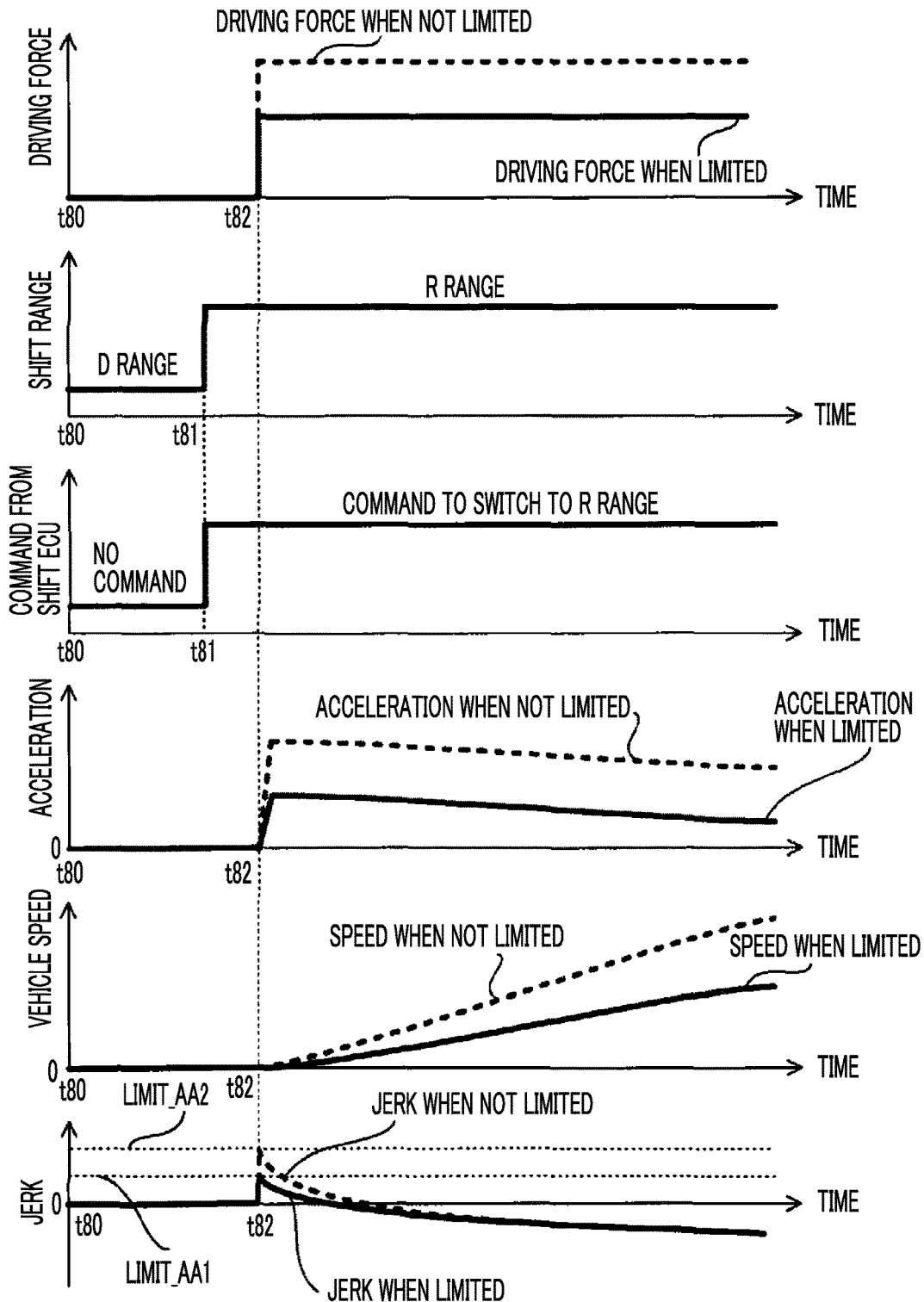

VEHICLE CONTROLLER

INCORPORATION BY REFERENCE

The disclosure of Japanese Patent Application No. 2016-217955 filed on Nov. 8, 2016 including the specification, drawings and abstract is incorporated herein by reference in its entirety.

BACKGROUND

1. Technical Field

The disclosure relates to a vehicle controller.

2. Description of Related Art

Japanese Patent Application Publication No. 2014-184746 (JP 2014-184746 A) and Japanese Patent Application Publication No. 5-272632 (JP 5-272632 A) disclose a parking support device that performs parking support capable of automatically parking a vehicle at a target position by automatically moving the vehicle along a moving route from a current position of the vehicle to the target position at which the vehicle should be parked as an example of a vehicle controller. A related art is disclosed in Japanese Patent Application Publication No. 2014-19295 (JP 2014-19295 A), which does not disclose a technique directly related to the disclosure.

SUMMARY

A parking support device may automatically switch a shift range of a transmission gear for the purpose of a quick turn of a vehicle when automatically parking the vehicle. Accordingly, the parking support device generally includes a shift control unit (for example, a shift ECU or a device for realizing shift-by-wire) that automatically switches the shift range of the transmission gear regardless of an operation of an occupant of the vehicle.

When an abnormality occurs in the shift control unit, there is a likelihood that the shift control unit will switch the shift range in spite of a situation in which the shift range should not be switched. Particularly, there is a likelihood that switching of the shift range accompanied by a change of a traveling direction of the vehicle will be performed by the shift control unit. In this case, in consideration of a non-zero likelihood that an abnormality with which the vehicle may travel in a direction which is not intended by an occupant without the occupant recognizing the switching of the shift range will occur in the shift control unit, it is necessary to secure safety of traveling of the vehicle when the shift range of the transmission gear is switched in a way that is not based on an operation by the occupant.

This problem may occur in a vehicle in which a shift range of a transmission gear can be automatically switched regardless of an operation of an occupant as well as the parking support device including the shift control unit.

The disclosure provides a vehicle controller that can cause a vehicle in which a shift range of a transmission gear can be automatically switched in a way that is not based on an operation of an occupant to travel safely.

An aspect of the disclosure provides a vehicle controller configured to control a vehicle which includes a transmission gear. The vehicle controller according to the aspect includes at least one electronic control unit. The at least one electronic control unit is configured to: determine whether a shift range of the transmission gear is switched such that the vehicle travels in a changed traveling direction not based on a shift range switching operation by an occupant of the vehicle; and limit, when it is determined that the shift range is switched such that the vehicle travels in the changed traveling direction not based on the shift range switching operation, a driving force of the vehicle such that the driving force of the vehicle is smaller than when it is determined that the shift range is not switched such that the vehicle travels in the changed traveling direction not based on the shift range switching operation.

According to the vehicle controller, when switching of the shift range accompanied with a change of the traveling direction of the vehicle is performed in a way that is not based on the operation by the occupant, the driving force of the vehicle is limited. Accordingly, in comparison with a case in which the driving force is not limited, it is possible to minimize traveling of the vehicle in a direction which is not intended by the occupant (for example, sudden protruding). Specifically, it is possible to minimize a vehicle speed or an acceleration of the vehicle in comparison with a case in which the driving force is not limited. Accordingly, the vehicle controller can cause the vehicle in which the shift range of the vehicle can be automatically switched in a way that is not based on the operation by the occupant to travel safely.

In the aspect, the at least one electronic control unit may be configured to: perform traveling support including shift range switching support of switching the shift range not based on the shift range switching operation on the vehicle; and determine whether the shift range is switched such that the vehicle travels in the changed traveling direction by the traveling support not based on the shift range switching operation.

According to this aspect, when the shift range switching support accompanied by a change of the traveling direction of the vehicle is performed, the driving force of the vehicle is limited. Accordingly, the vehicle controller can cause the vehicle to travel safely.

In the aspect, the at least one electronic control unit may be configured to perform parking support for automatically parking the vehicle at a target position as traveling support.

When the parking support is performed, there is a relatively high likelihood that the shift range switching support accompanied by a change of the traveling direction of the vehicle will be performed for the purpose of a quick turn of the vehicle or the like. Accordingly, there is a relatively high likelihood that the vehicle capable of performing the parking support will include a control unit that performs the shift range switching support of switching the shift range in a way that is not based on the operation by the occupant. Accordingly, according to this aspect, it is possible to cause a vehicle having a relatively high likelihood that the shift range switching support accompanied by a change of the traveling direction of the vehicle will be performed to travel safely.

In the aspect, the at least one electronic control unit may be configured to limit the driving force of the vehicle by setting the driving force actually output by the vehicle to be smaller than a required driving force required for the vehicle.

According to this aspect, it is possible to appropriately limit the driving force of the vehicle.

In the aspect, the required driving force may be determined based on an amount of depression of an accelerator pedal by the occupant.

According to this aspect, it is possible to appropriately minimize sudden protruding of the vehicle in a direction which is not intended by the occupant due to the occupant's depression of the accelerator pedal.

In the aspect, the at least one electronic control unit may be configured to limit, when it is determined that the shift range is switched such that the vehicle travels in the changed traveling direction, the driving force of the vehicle by setting at least one of an upper limit value of the driving force of the vehicle, an upper limit value of a vehicle speed of the vehicle, an upper limit value of an acceleration of the vehicle, and an upper limit value of a jerk of the vehicle to be smaller than when it is determined that the shift range is not switched such that the vehicle travels in the changed traveling direction.

In the aspect, the at least one electronic control unit may be configured to: detect an obstacle existing in the changed traveling direction; and limit the driving force of the vehicle based on a distance between the vehicle and the obstacle.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a timing chart illustrating a vehicle state in which a driving force is limited in a situation in which a shift range switching command accompanied by a change of a traveling direction of the vehicle is input to a shift actuator;

FIG. 5 is a timing chart illustrating a vehicle state in which a driving force is limited in a situation in which the shift range switching command accompanied by a change of the traveling direction of the vehicle is input to the shift actuator;

FIG. 6 is a timing chart illustrating a vehicle state in which a driving force is limited in a situation in which the shift range switching command accompanied by a change of the traveling direction of the vehicle is input to the shift actuator;

FIG. 7 is a timing chart illustrating a vehicle state in which a driving force is limited in a situation in which the shift range switching command accompanied by a change of the traveling direction of the vehicle is input to the shift actuator; and FIG. 8 is a timing chart illustrating a vehicle state in which a driving force is limited in a situation in which the shift range switching command accompanied by a change of the traveling direction of the vehicle is input to the shift actuator.

DETAILED DESCRIPTION OF EMBODIMENTS

Hereinafter, a vehicle controller according to an embodiment will be described with reference to the accompanying drawings. In the following description, a vehicle 1 in which a vehicle controller according to an embodiment is mounted will be exemplified.

(1) Configuration of Vehicle 1

Figure 1:
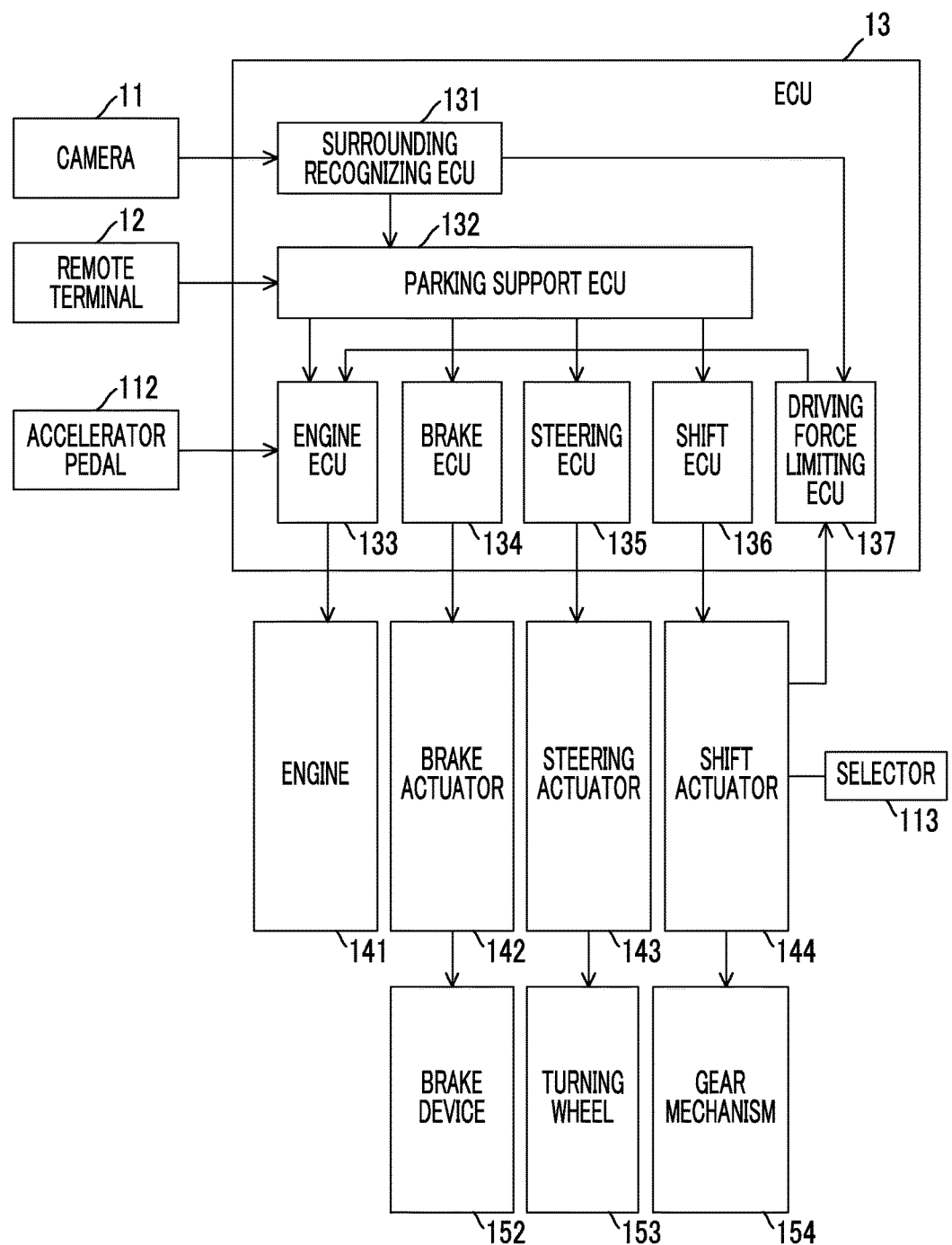
FIG. 1 is a block diagram illustrating a configuration of a vehicle according to an embodiment.

A configuration of the vehicle 1 according to this embodiment will be described below with reference to FIG. 1. As illustrated in FIG. 1, the vehicle 1 includes a camera 11, an accelerator pedal 112, a selector (that is, a shift lever) 113, an electronic control unit (ECU) 13 which is a specific example of the above-mentioned "vehicle controller," an engine 141, a brake actuator 142, a steering actuator 143, a shift actuator 144, a brake device 152, turning wheels 153, and a gear mechanism (so-called transmission) 154 which is a specific example of the above-mentioned "transmission gear."

The camera 11 is an imaging device that images surroundings of the vehicle 1. The accelerator pedal 112 is operated by an occupant to control a driving force of the vehicle 1. The selector 113 is operated by the occupant to switch a shift range of the gear mechanism 154.

The ECU 13 controls the entire operation of the vehicle 1. In this embodiment, particularly, the ECU 13 performs a parking support operation for automatically parking the vehicle 1 at a target position (for example, in a parking lot, a parking space in a parking lot, or a parking space on a road). The ECU 13 performs a driving force limiting operation of limiting the driving force of the vehicle 1 when switching of the shift range accompanied by a change of a traveling direction of the vehicle 1 is performed in a way that is not based on an operation by the occupant in addition to the parking support operation.

The ECU 13 performs the parking support operation in accordance with an instruction from the occupant using a remote terminal 12. Specifically, the remote terminal 12 includes an operation button which is pushed by the occupant when the occupant requests execution of the parking support operation. The remote terminal 12 notifies the ECU 13 of a push result of the operation button.

In order to perform the parking support operation and the driving force limiting operation, the ECU 13 includes a surrounding recognizing ECU 131, a parking support ECU 132, an engine ECU 133, a brake ECU 134, a steering ECU 135, a shift ECU 136, and a driving force limiting ECU 137 as processing blocks which are logically embodied in the ECU 13 or processing circuits which are physically embodied therein.

The surrounding recognizing ECU 131 recognizes surrounding conditions of the vehicle 1 based on image information which is an imaging result of the camera 11. The parking support ECU 132 generates (that is, calculates) a moving route in which the vehicle 1 should move from a current position of the vehicle 1 to a target position based on the recognition result of the surrounding recognizing ECU 131. The parking support ECU 132 controls the engine ECU 133, the brake ECU 134, the steering ECU 135, and the shift ECU 136 such that the vehicle 1 moves automatically along the generated moving route.

The engine ECU 133 controls the engine 141 such that the vehicle 1 moves automatically to the target position under the control of the parking support ECU 132. The engine ECU 133 controls the engine 141 such that the vehicle 1 outputs a required driving force which is determined depending on an amount of depression of the accelerator pedal 112 regardless of the control of the parking support ECU 132.

The brake ECU 134 controls the brake actuator 142 such that the vehicle 1 moves automatically to the target position under the control of the parking support ECU 132. The brake actuator 142 controls the brake device 152 that can brake vehicle wheels which are not illustrated such that a braking force is applied to the vehicle 1 under the control of the brake ECU 134. Accordingly, the brake ECU 134 and the brake actuator 142 constitute a so-called brake-by-wire system.

The steering ECU 135 controls the steering actuator 143 such that the vehicle 1 moves automatically to the target position under the control of the parking support ECU 132. The steering actuator 143 turns the turning wheels 153 which can be turned such that the vehicle 1 moves in a desired direction under the control of the steering ECU 135. Accordingly, the steering ECU 135 and the steering actuator 143 constitute a so-called steer-by-wire system.

The shift ECU 136 controls the shift actuator 144 such that the vehicle 1 moves automatically to the target position under the control of the parking support ECU 132. The shift actuator 144 controls the gear mechanism 154 such that a gear range of the gear mechanism 154 capable of transmitting power of the engine 141 to the driving wheels is switched to a desired gear range under the control of the shift ECU 136. Accordingly, the shift ECU 136 and the shift actuator 144 constitute a so-called shift-by-wire system. The shift actuator 144 controls the gear mechanism 154 such that the gear range of the gear mechanism 154 is switched to a gear range corresponding to the operation of the selector 113.

The driving force limiting ECU 137 controls the engine 141 such that the driving force of the vehicle 1 is limited when switching of the shift range accompanied by a change of the traveling direction of the vehicle 1 is performed in a way that is not based on the operation of the selector 113 by the occupant (that is, is performed by the shift actuator 144 under the control of the shift ECU 136).

(2) Operation of ECU 13

The parking support operation and the driving force limiting operation which are performed by the ECU 13 will be sequentially described below.

(2-1) Flow of Parking Support Operation

Figure 2:
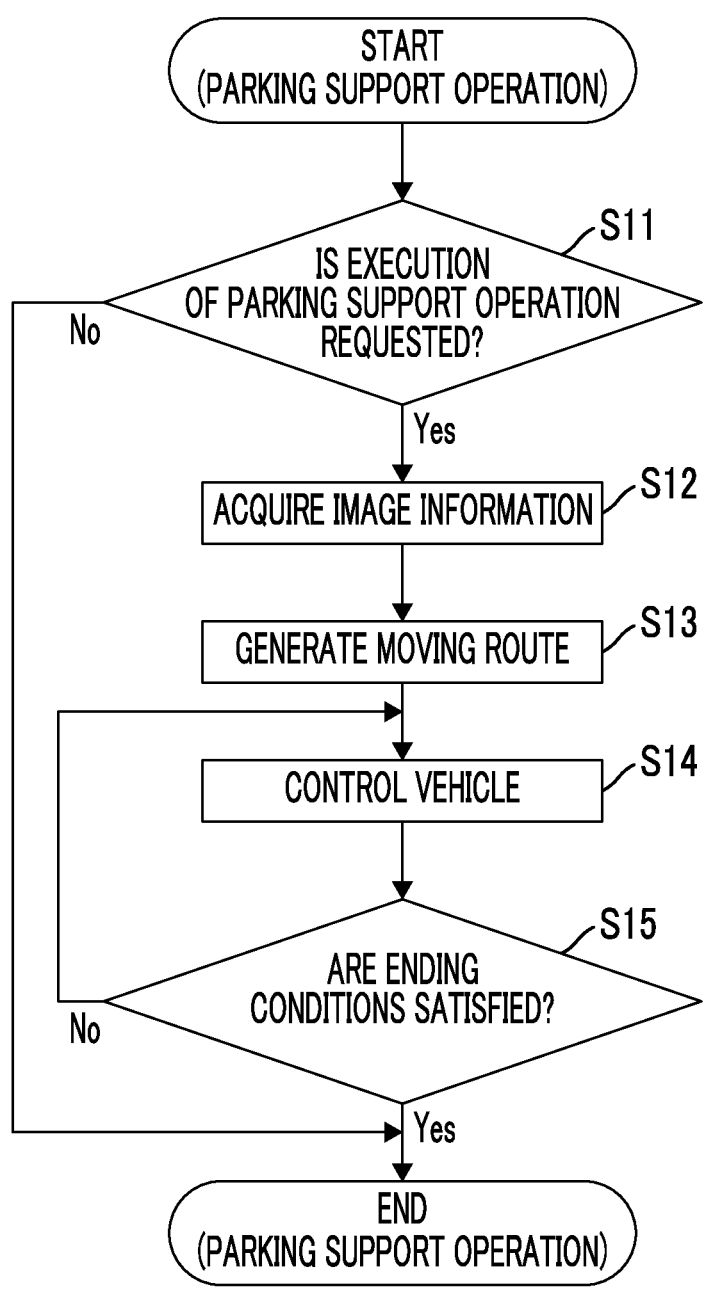
FIG. 2 is a flowchart illustrating a routine of a parking support operation according to the embodiment.

A flow of the parking support operation will first be described below with reference to the flowchart illustrated in FIG. 2. As illustrated in FIG. 2, the parking support ECU 132 determines whether the occupant has requested execution of the parking support operation by communicating with the remote terminal 12 (Step S11). Specifically, when the occupant has pushed the operation button of the remote terminal 12, the parking support ECU 132 determines that the occupant has requested execution of the parking support operation.

When it is determined in Step S11 that the occupant has not requested execution of the parking support operation (NO in Step S11), the ECU 13 ends the parking support operation illustrated in FIG. 2. When the parking support operation illustrated in FIG. 2 is ended, the ECU 13 restarts the parking support operation illustrated in FIG. 2 after a first predetermined period elapses.

On the other hand, when it is determined in Step S11 that the occupant has requested execution of the parking support operation (YES in Step S11), the surrounding recognizing ECU 131 acquires imaging information which is an imaging result of the camera 11 from the camera 11 (Step S12). Thereafter, the parking support ECU 132 generates a moving route in which the vehicle 1 should move from a current position of the vehicle 1 to a target position based on the recognition result of the surrounding recognizing ECU 131 (Step S13). Thereafter, the parking support ECU 132 causes the vehicle 1 to move automatically along the moving route generated in Step S13 by controlling the engine ECU 133, the brake ECU 134, the steering ECU 135, and the shift ECU 136 (Step S14). As a result, the vehicle 1 is automatically parked at the target position without the occupant's operation of the accelerator pedal 112, a brake pedal, a steering wheel, or the selector 113.

Thereafter, the parking support ECU 132 determines whether ending conditions for ending the parking support operation have been satisfied (Step S15). The ending conditions may include a first condition that the vehicle 1 reaches a target position. The ending conditions may include a second condition that an occupant does not request execution of the parking support operation (that is, an occupant does not push the operation button of the remote terminal 12).

When it is determined in Step S15 that the ending conditions have been satisfied (YES in Step S15), the ECU 13 ends the parking support operation illustrated in FIG. 2. On the other hand, when it is determined in Step S15 that the ending conditions have not been satisfied (NO in Step S15), the operations of Step S14 and the steps subsequent thereto are repeatedly performed. That is, the parking support ECU 132 continues to cause the vehicle 1 to move automatically.

(2-2) Flow of Driving Force Limiting Operation

A flow of the driving force limiting operation will be described below with reference to the flowchart illustrated in FIG. 3.

Figure 3:
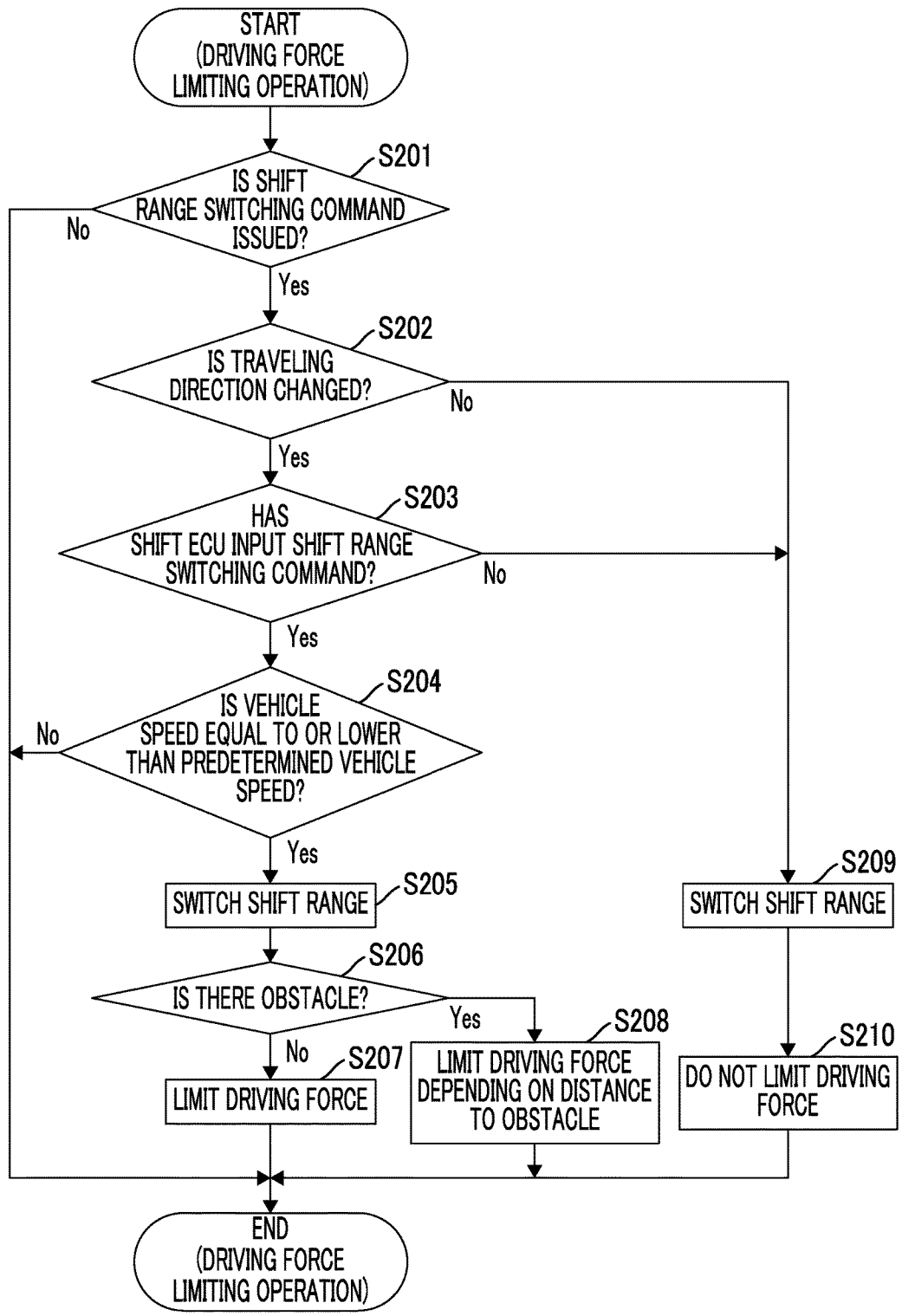
FIG. 3 is a flowchart illustrating a routine of a driving force limiting operation according to the embodiment.

As illustrated in FIG. 3, the driving force limiting ECU 137 determines whether a command for switching the shift range of the gear mechanism 154 (hereinafter referred to as a "shift range switching command") is issued to the shift actuator 144 (Step S201). The shift range switching command can be input from at least one of the shift ECU 136 and the selector 113 to the shift actuator 144. For the determination of Step S201, the shift actuator 144 notifies the driving force limiting ECU 137 when the shift range switching command has been input.

When it is determined in Step S201 that the shift range switching command has not been input (NO in Step S201), the ECU 13 ends the driving force limiting operation illustrated in FIG. 3. When the driving force limiting operation illustrated in FIG. 3 is ended, the ECU 13 restarts the driving force limiting operation illustrated in FIG. 3 after a second predetermined period elapses.

On the other hand, when it is determined in Step S201 that the shift range switching command has been input (YES in Step S201), the driving force limiting ECU 137 determines whether the shift range switching command input to the shift actuator 144 is a shift range switching command accompanied by a change of the traveling direction of the vehicle 1 (Step S202).

The "shift range switching command accompanied by a change of the traveling direction of the vehicle 1" in this embodiment refers to a "shift range switching command for causing the vehicle 1 to travel after the traveling direction of the vehicle 1 has been changed." Accordingly, the "shift range switching command accompanied by a change of the traveling direction of the vehicle 1" includes a command to switch the shift range of the gear mechanism 154 from the shift range in which the vehicle 1 travels in one direction to a shift range in which the vehicle 1 travels in a direction other than the one direction. Specific examples of the shift range switching command accompanied by a change of the traveling direction of the vehicle 1 include a command to switch the shift range from a D range (that is a drive range) in which the vehicle 1 travels forward to an R range (that is, a reverse range) in which the vehicle 1 travels rearward and a command to switch the shift range from the R range to the D range. The "shift range switching command accompanied by a change of the traveling direction of the vehicle 1" also includes a command to switch the shift range of the gear mechanism 154 from a shift range in which the vehicle 1 is not intended to travel in any direction and a shift range in which the vehicle 1 travels in any direction. In this case, the traveling direction of the vehicle 1 is also changed due to switching of the shift range. Specific examples of the shift range switching command accompanied by a change of the traveling direction of the vehicle 1 also include a command to switch the shift range from a P range in which an axle of the vehicle 1 is mechanically locked to the D range or the R range and a command to switch the shift range from an N range in which the axle and the engine 141 are separated from each other to the D range or the R range.

When it is determined in Step S202 that the shift range switching command input to the shift actuator 144 is a shift range switching command accompanied by a change of the traveling direction of the vehicle 1 (YES in Step S202), the driving force limiting ECU 137 determines whether the shift range switching command is input from the shift ECU 136 to the shift actuator 144 (Step S203). That is, the driving force limiting ECU 137 determines whether the shift range switching command input to the shift actuator 144 is a shift range switching command which is not based on the occupant's operation of the selector 113. In order to perform the determination of Step S203, the shift actuator 144 notifies the driving force limiting ECU 137 of an input source of the shift range switching command.

When it is determined in Step S203 that the shift range switching command is input from the shift ECU 136 to the shift actuator 144 (YES in Step S203), the driving force limiting ECU 137 determines whether a vehicle speed of the vehicle 1 is equal to or less than a predetermined vehicle speed (Step S204). The predetermined vehicle speed is set to an appropriate vehicle speed at which a state in which the vehicle speed is low enough to switch the shift range accompanied by a change of the traveling direction of the vehicle 1 and a state in which the vehicle speed is high enough to cause a likelihood that an abnormality (for example, destruction) will occur in the gear mechanism 154 by performing the switching of the shift range accompanied by a change of the traveling direction of the vehicle 1 can be distinguished from each other.

When it is determined in Step S204 that the vehicle speed is not equal to or less than the predetermined vehicle speed (NO in Step S204), it is assumed that when the switching of the shift range accompanied by a change of the traveling direction of the vehicle 1 is performed, there is a likelihood that an abnormality will occur in the gear mechanism 154. Accordingly, in this case, the shift actuator 144 does not switch the shift range in accordance with the shift range switching command. Thereafter, the ECU 13 ends the driving force limiting operation illustrated in FIG. 3.

On the other hand, when it is determined in Step S204 that the vehicle speed is equal to or less than the predetermined vehicle speed (YES in Step S204), the shift actuator 144 switches the shift range in accordance with the shift range switching command (Step S205).

Here, a likelihood that the shift range switching command is a shift range switching command input from the shift ECU 136 having an abnormality occurring therein to the shift actuator 144 is not zero. When the shift range switching command is input from the shift ECU 136 having an abnormality occurring therein to the shift actuator 144, there is a likelihood that the switching of the shift range based on the shift range switching command is switching of the shift range which is not intended by the occupant or not recognized by the occupant. Accordingly, there is a likelihood that the traveling direction of the vehicle 1 will be changed to a direction which is not intended by the occupant by only simply switching the shift range in accordance with the shift range switching command. As a result, there is a likelihood that the vehicle 1 will protrude suddenly in a direction which is not intended by the occupant.

Therefore, in this embodiment, in order to prevent sudden protruding of the vehicle 1 in a direction which is not intended by the occupant, the driving force limiting ECU 137 limits the driving force of the vehicle 1 in parallel with switching of the shift range in Step S205 (Steps S206 to S208). That is, the driving force limiting ECU 137 limits the driving force of the vehicle 1 when the shift range switching command accompanied by a change of the traveling direction is input from the shift ECU 136 more than when the shift range switching command accompanied by a change of the traveling direction is not input from the shift ECU 136. FIG. 3 illustrates an example in which the driving force of the vehicle 1 is limited in Step S206 to S208 subsequently to the switching of the shift range in Step S205, for the purpose of simplification of the drawing. However, actually, the switching of the shift range in Step S205 and the limiting of the driving force of the vehicle 1 in Steps S206 to S208 are performed in parallel (in other words, substantially simultaneously).

In order to limit the driving force, first, the driving force limiting ECU 137 determines whether an obstacle interfering with traveling of the vehicle 1 is present on the front side in the traveling direction of the vehicle 1 after the shift range has been switched based on the recognition result of the surrounding recognizing ECU 131 (the surrounding conditions of the vehicle 1) (Step S206). Examples of the obstacle include another vehicle, a pedestrian, a fallen object fallen on a road, and an installed object installed on a road.

When it is determined in step S206 that an obstacle is not present (NO in Step S206), the driving force limiting ECU 137 limits the actual driving force of the vehicle 1 (Step S207). Specifically, in this embodiment, when a shift range switching command accompanied by a change of the traveling direction is not input from the shift ECU 136, the driving force of the vehicle 1 is not limited as will be described later. That is, in this case, the driving force of the vehicle 1 matches the required driving force. Accordingly, the driving force limiting ECU 137 limits the actual driving force of the vehicle 1 with respect to the required driving force. That is, the driving force limiting ECU 137 limits the actual driving force of the vehicle 1 such that the actual driving force is smaller than the required driving force. Here, the driving force limiting ECU 137 does not limit the driving force of the vehicle 1 to zero.

The required driving force is determined based on an amount of depression of the accelerator pedal 112 as described above. Alternatively, even when an occupant does not depress the accelerator pedal 112, the vehicle 1 can be automatically parked by the parking support operation as described above. Accordingly, the required driving force may be a driving force required for the vehicle 1 to move to a target position under the control of the parking support ECU 132. That is, the required driving force may be set by the parking support ECU 132.

As a result, in comparison with a case in which the driving force is not limited (that is, when the shift range switching command accompanied by a change of the traveling direction has not been input from the shift ECU 136), acceleration of the vehicle 1 is suppressed. Alternatively, in comparison with a case in which the driving force is not limited, the vehicle speed is suppressed. As a result, it is possible to prevent sudden protruding of the vehicle 1 in a direction which is not intended by an occupant. Accordingly, in comparison with a case in which the driving force is not limited, the vehicle 1 can travel more safely.

A specific example of the driving force limiting operation in a situation in which the shift range switching command accompanied by a change of the traveling direction of the vehicle 1 is input to the shift actuator 144 will be described below with reference to the timing chart illustrated in FIG. 4. First, as illustrated in FIG. 4, it is assumed that the vehicle 1 stops at time t40. Accordingly, at time t40, the driving force, the acceleration, the vehicle speed, and the jerk are zero. It is also assumed that the shift range of the gear mechanism 154 is the D range at time t40. An example of the vehicle 1 in this situation is a state in which the vehicle 1 stops at a red light. Hereinafter, the vehicle 1 which stops at a red light will be exemplified.

Thereafter, at time t41 at which a traffic light is a red light, it is assumed that a shift range switching command for switching the shift range from the D range to the R range is input from the shift ECU 136 to the shift actuator 144. The vehicle 1 stops at a red light, but an occupant will not request execution of the parking support operation. Accordingly, the shift range switching command is estimated to be input due to an abnormality occurring in the shift ECU 136. Accordingly, there is a likelihood that switching of the shift range in accordance with the shift range switching command is not recognized by the occupant.

In this case, it is determined that the shift range switching command accompanied by a change of the traveling direction of the vehicle 1 is input from the shift ECU 136 to the shift actuator 144 (YES in Steps S202 and S203 in FIG. 3) and it is determined that the vehicle speed is zero (=equal to or less than the predetermined vehicle speed). Accordingly, at time t41, the shift range is switched from the D range to the R range in accordance with the shift range switching command. In addition, after time t41, the driving force of the vehicle 1 is limited. At time t41, the vehicle 1 stops and the driving force of the vehicle 1 is zero.

Thereafter, at time t42, it is assumed that the traffic light is switched from a red light to a green light. The occupant depresses the accelerator pedal 112 to start the vehicle 1. On the other hand, when the shift range is switched to the R range and thus the vehicle 1 starts rearward, instead of forward which is the traveling direction which is intended by the occupant. That is, the vehicle 1 suddenly protrudes rearward. However, the actual driving force (see a thick solid line in the first-stage graph in FIG. 4) of the vehicle 1 is limited to be smaller than the required driving force (that is, an original driving force of the vehicle 1 when the shift range would not be switched to the R range: see a thick dotted line in the first-stage graph in FIG. 4). Accordingly, as illustrated in the fourth-stage group in FIG. 4, an acceleration (see a thick solid line) of the vehicle 1 when the driving force is limited is smaller (that is, less) than the acceleration (see a thick dotted line) of the vehicle 1 when the driving force is not limited in a period after the vehicle 1 starts. Accordingly, as illustrated in the fifth-stage graph in FIG. 4, the vehicle speed (see a thick solid line) of the vehicle 1 when the driving force is limited is lower (that is, less) than the vehicle speed (see a thick dotted line) of the vehicle 1 when the driving force is not limited in a period after the vehicle 1 starts. As illustrated in the sixth-stage graph in FIG. 4, the jerk (see a thick solid line) of the vehicle 1 when the driving force is limited is smaller (that is, less) than the jerk (see a thick dotted line) of the vehicle 1 when the driving force is not limited in at least a partial period after the vehicle 1 starts. Accordingly, when the driving force is limited, sudden protruding of the vehicle 1 is minimized in comparison with a case in which the driving force is not limited. As a result, when the driving force is limited, it is possible to cause the vehicle 1 to travel more safely (in other words, while avoiding danger) in comparison with a case in which the driving force is not limited.

The vehicle 1 reaches an obstacle present on the rear side of the vehicle 1 at time t43 when the driving force is not limited, but the vehicle 1 reaches the obstacle present on the rear side of the vehicle 1 at time t44 which is posterior to time t43 when the driving force is limited. Accordingly, a time in which the occupant can cope with the protruding after the vehicle 1 suddenly protrudes can be secured to be relatively long. Accordingly, since the occupant can be expected to cope with the protruding when the driving force is limited better than when the driving force is not limited, it is possible to allow the vehicle 1 to travel more safely.

Referring to FIG. 3 again, when it is determined in Step S206 that an obstacle is present (YES in Step S206), the driving force limiting ECU 137 limits the actual driving force of the vehicle 1 (Step S208). In this case, the driving force limiting ECU 137 changes a degree of limiting of the driving force depending on a distance between the obstacle and the vehicle 1. Specifically, as the distance between the obstacle and the vehicle 1 decreases, the likelihood that the vehicle 1 will collide with the obstacle due to the sudden protruding of the vehicle 1 increases. As a result, the driving force limiting ECU 137 limits the driving force such that the driving force is limited more (that is, becomes smaller) as the distance between the obstacle and the vehicle 1 becomes smaller to avoid collision of the vehicle 1 with the obstacles.

On the other hand, when it is determined in Step S202 that the shift range switching command input to the shift actuator 144 is not a shift range switching command accompanied by a change of the traveling direction of the vehicle 1 (NO in Step S202), the vehicle 1 does not suddenly protrude in a direction which is not intended by the occupant even if the occupant does not recognize switching of the shift range based on the shift range switching command. Accordingly, in this case, the shift actuator 144 switches the shift range in accordance with the shift range switching command (Step S209) and the driving force limiting ECU 137 does not limit the driving force of the vehicle 1 (Step S210). When the driving force is already limited at a time point at which Step S210 is performed, the driving force limiting ECU 137 releases limiting of the driving force.

On the other hand, when it is determined in Step S203 that the shift range switching command is not input from the ECU 136 to the shift actuator 144 (NO in Step S203), it is assumed that the shift range switching command based on the occupant's operation of the selector 113 is input to the shift actuator 144. In this case, the occupant recognizes that switching of the shift range which is performed in accordance with the shift range switching command is natural. Accordingly, in this case, the shift actuator 144 switches the shift range in accordance with the shift range switching command (Step S209) and the driving force limiting ECU 137 does not limit the driving force of the vehicle 1 (Step S210).

As described above, according to the driving force limiting operation in this embodiment, the shift range switching command accompanied by a change of the traveling direction of the vehicle 1 is output from the shift ECU 136 (that is, input to the shift actuator 144), the driving force of the vehicle 1 is limited. Accordingly, the shift range switching command accompanied by a change of the traveling direction of the vehicle 1 is erroneously output from the shift ECU 136 in which an abnormality already occurs, sudden protruding of the vehicle 1 in a traveling direction which is not intended by the occupant is suppressed. Accordingly, the vehicle 1 can travel relatively safely (in other words, while relatively avoiding danger).

In the above-mentioned driving force limiting operation, the driving force is limited even when the shift range switching command accompanied by a change of the traveling direction of the vehicle 1 is output from the shift ECU 136 which functions normally. However, when the vehicle 1 is automatically parked at a target position by the parking support operation, the shift range switching command accompanied by a change of the traveling direction of the vehicle 1 is output from the shift ECU 136 which functions normally. When the vehicle 1 is automatically parked at the target position by the parking support operation, the driving force of the vehicle 1 is originally small. Accordingly, even if the driving force is limited, traveling of the vehicle 1 which is intended to park at a target position is hardly hindered. Accordingly, in the above-mentioned driving force limiting operation, when the shift range switching command accompanied by a change of the traveling direction of the vehicle 1 is output from the shift ECU 136, the driving force is limited regardless of whether the shift ECU 136 is normal or abnormal based on a design concept for fail-safe.

According to the driving force limiting operation in this embodiment, the driving force is limited, but the driving force is not limited to zero. That is, the driving force limiting operation limits the driving force in a range in which traveling of the vehicle 1 continues. Accordingly, the driving force limiting operation can cause the vehicle 1 to travel relatively safely in a situation in which the shift range switching command accompanied by a change of the traveling direction of the vehicle 1 is output from the shift ECU 136 while maintaining traveling of the vehicle 1.

In the driving force limiting operation in this embodiment, when the vehicle speed is not equal to or lower than a predetermined vehicle speed, the shift range is not switched in accordance with the shift range switching command accompanied by a change of the traveling direction of the vehicle 1. This process is a process for preventing damage of the gear mechanism 154, and can also be said to be a process for prevent sudden protruding of the vehicle 1. This is because when the vehicle speed is equal to or lower than the predetermined vehicle speed, switching of the shift range is selectively allowed, but a moving distance due to the sudden protruding of the vehicle 1 is smaller than that when switching of the shift range is performed in a situation in which the vehicle speed is not equal to or lower than the predetermined vehicle speed.

In the above description, the driving force limiting ECU 137 limits the actual driving force of the vehicle 1 with respect to the required driving force which is determined based on the amount of depression of the accelerator pedal 112 or which is set by the parking support ECU 132. However, sudden protruding of the vehicle 1 in a direction which is not intended by an occupant occurs mainly when the occupant depresses the accelerator pedal 112. This is because when the parking support ECU 132 sets the required driving force, the vehicle 1 moves to the target position under the control of the parking support ECU 132. Accordingly, the driving force limiting ECU 137 limits the actual driving force of the vehicle 1 with respect to the required driving force which is determined based on the amount of depression of the accelerator pedal 112, but may not limit the actual driving force of the vehicle 1 with respect to the required driving force which is set by the parking support ECU 132. In other words, when the required driving force is set by the parking support ECU 132, the driving force limiting ECU 137 may not limit the actual driving force of the vehicle 1 as long as the accelerator pedal 112 is not depressed. As a result, the driving force limiting ECU 137 can prevent sudden protruding of the vehicle 1 in a traveling direction which is not intended by an occupant without interfering with movement of the vehicle 1 to the target position by the parking support operation.

In the above description, the driving force limiting ECU 137 limits the actual driving force of the vehicle 1 with respect to the required driving force. However, the driving force limiting ECU 137 may limit the actual driving force of the vehicle 1 by another method. An example of the other method of limiting the actual driving force of the vehicle 1 will be described below with reference to FIGS. 5 to 8. FIGS. 5 to 8 are timing charts illustrating a state of the vehicle 1 in the same situation as the situation illustrated in FIG. 4. That is, FIGS. 5 to 8 are timing charts illustrating a state of the vehicle 1 which stops with the shift range set to the D range at time tk0 (where k is 5, 6, 7, or 8), switches the shift range from the D range to the R range at time tk1, and starts at time tk2.

As illustrated in FIG. 5, the driving force limiting ECU 137 may limit the driving force by setting an upper limit value LIMIT_P1 of the driving force when a shift range switching command accompanied by a change of the traveling direction of the vehicle 1 is output from the shift ECU 136 to be less than an upper limit value LIMIT_P2 of the driving force when a shift range switching command accompanied by a change of the traveling direction of the vehicle 1 is not output from the shift ECU 136. When the shift range switching command accompanied by a change of the traveling direction of the vehicle 1 is output, the driving force limiting ECU 137 controls the engine 141 such that the driving force of the vehicle 1 does not exceed the upper limit value LIMIT_P1. On the other hand, when the shift range switching command accompanied by a change of the traveling direction of the vehicle 1 is not output, the driving force limiting ECU 137 controls the engine 141 such that the driving force of the vehicle 1 does not exceed the upper limit value LIMITP_2. As a result, when the shift range switching command accompanied by a change of the traveling direction of the vehicle 1 is output, the driving force is more appropriately limited in comparison with a case in which the shift range switching command accompanied by a change of the traveling direction of the vehicle 1 is not output.

As illustrated in FIG. 6, the driving force limiting ECU 137 may substantially limit the driving force by setting an upper limit value LIMIT_A1 of the acceleration of the vehicle 1 when a shift range switching command accompanied by a change of the traveling direction of the vehicle 1 is output from the shift ECU 136 to be less than an upper limit value LIMIT_A2 of the acceleration when a shift range switching command accompanied by a change of the traveling direction of the vehicle 1 is not output from the shift ECU 136. When the shift range switching command accompanied by a change of the traveling direction of the vehicle 1 is output, the driving force limiting ECU 137 controls the engine 141 such that the acceleration does not exceed the upper limit value LIMIT_A1. On the other hand, when the shift range switching command accompanied by a change of the traveling direction of the vehicle 1 is not output, the driving force limiting ECU 137 controls the engine 141 such that the acceleration does not exceed the upper limit value LIMIT_A2. As a result, when the shift range switching command accompanied by a change of the traveling direction of the vehicle 1 is output, the acceleration is more limited in comparison with a case in which the shift range switching command accompanied by a change of the traveling direction of the vehicle 1 is not output. When the acceleration is limited, the driving force is also limited to suppress rapid acceleration of the vehicle 1 in comparison with a case in which the acceleration is not limited. As a result, in this case, when the shift range switching command accompanied by a change of the traveling direction of the vehicle 1 is output, the driving force is more appropriately limited in comparison with a case in which the shift range switching command accompanied by a change of the traveling direction of the vehicle 1 is not output.

As illustrated in FIG. 7, the driving force limiting ECU 137 may substantially limit the driving force by setting an upper limit value LIMIT_V1 of the vehicle speed of the vehicle 1 when a shift range switching command accompanied by a change of the traveling direction of the vehicle 1 is output from the shift ECU 136 to be less than an upper limit value LIMIT_V2 of the vehicle speed when a shift range switching command accompanied by a change of the traveling direction of the vehicle 1 is not output from the shift ECU 136. When the shift range switching command accompanied by a change of the traveling direction of the vehicle 1 is output, the driving force limiting ECU 137 controls the engine 141 such that the vehicle speed does not exceed the upper limit value LIMIT_V1. On the other hand, when the shift range switching command accompanied by a change of the traveling direction of the vehicle 1 is not output, the driving force limiting ECU 137 controls the engine 141 such that the vehicle speed does not exceed the upper limit value LIMIT_V2. As a result, when the shift range switching command accompanied by a change of the traveling direction of the vehicle 1 is output, the vehicle speed is more limited in comparison with a case in which the shift range switching command accompanied by a change of the traveling direction of the vehicle 1 is not output. When the vehicle speed is limited, the driving force is also limited to suppress acceleration of the vehicle 1 (that is, an increase in vehicle speed) in comparison with a case in which the vehicle speed is not limited. As a result, in this case, when the shift range switching command accompanied by a change of the traveling direction of the vehicle 1 is output, the driving force is more appropriately limited in comparison with a case in which the shift range switching command accompanied by a change of the traveling direction of the vehicle 1 is not output.

FIG. 7 illustrates an example in which the driving force is not limited immediately after the vehicle 1 starts and the driving force is limited after the vehicle speed reaches the upper limit value LIMIT_V1 at time t73. However, the vehicle speed may be limited by limiting the driving force immediately after the vehicle 1 starts.

As illustrated in FIG. 8, the driving force limiting ECU 137 may substantially limit the driving force by setting an upper limit value LIMIT_AA1 of the jerk of the vehicle 1 when a shift range switching command accompanied by a change of the traveling direction of the vehicle 1 is output from the shift ECU 136 to be less than an upper limit value LIMIT_AA2 of the jerk when a shift range switching command accompanied by a change of the traveling direction of the vehicle 1 is not output from the shift ECU 136. When the shift range switching command accompanied by a change of the traveling direction of the vehicle 1 is output, the driving force limiting ECU 137 controls the engine 141 such that the jerk does not exceed the upper limit value LIMIT_AA1. On the other hand, when the shift range switching command accompanied by a change of the traveling direction of the vehicle 1 is not output, the driving force limiting ECU 137 controls the engine 141 such that the jerk does not exceed the upper limit value LIMIT_AA2. As a result, when the shift range switching command accompanied by a change of the traveling direction of the vehicle 1 is output, the jerk is more limited in comparison with a case in which the shift range switching command accompanied by a change of the traveling direction of the vehicle 1 is not output. When the jerk is limited, the driving force is also limited to suppress rapid acceleration of the vehicle 1 in comparison with a case in which the acceleration is not limited. As a result, in this case, when the shift range switching command accompanied by a change of the traveling direction of the vehicle 1 is output, the driving force is more appropriately limited in comparison with a case in which the shift range switching command accompanied by a change of the traveling direction of the vehicle 1 is not output.

In the above description, the driving force limiting ECU 137 limits the driving force of the vehicle 1 by controlling the engine 141. However, the driving force limiting ECU 137 may limit the driving force of the vehicle 1 by controlling the brake actuator 142. In this case, the driving force of the vehicle 1 can also be limited by adjusting a braking force which is applied from the brake device 152.

The embodiments can be appropriately modified without departing from the gist or spirit which can be read from the whole specification, and a vehicle controller including such modifications is also included in the technical spirit of the disclosure.

What is claimed is:

1. A vehicle controller configured to control a vehicle, the vehicle including a transmission gear, the vehicle controller comprising:
   a driving force control unit configured to generate a driving force of the vehicle based on a required driving force, which is determined on the basis of an amount of depression of an accelerator pedal by an occupant of the vehicle; and
   at least one electronic control unit configured to:
      determine whether a shift range of the transmission gear is switched such that the vehicle travels in a changed traveling direction not based on a shift range switching operation by the occupant of the vehicle; and
      limit, when it is determined that the shift range is switched such that the vehicle travels in the changed traveling direction not based on the shift range switching operation, the driving force of the vehicle by setting the driving force actually output by the driving force control unit to be smaller than the required driving force compared with when it is determined that the shift range is not switched such that the vehicle travels in the changed traveling direction not based on the shift range switching operation.

2. The vehicle controller according to claim 1, wherein the at least one electronic control unit is configured to:
   perform traveling support including shift range switching support of switching the shift range not based on the shift range switching operation on the vehicle; and
   determine whether the shift range is switched such that the vehicle travels in the changed traveling direction by the traveling support not based on the shift range switching operation.

3. The vehicle controller according to claim 2, wherein the at least one electronic control unit is configured to perform parking support for automatically parking the vehicle at a target position as the traveling support.

4. The vehicle controller according to claim 1, wherein the at least one electronic control unit is configured to limit, when it is determined that the shift range is switched such that the vehicle travels in the changed traveling direction, the driving force of the vehicle by setting at least one of an upper limit value of the driving force of the vehicle, an upper limit value of a vehicle speed of the vehicle, an upper limit value of an acceleration of the vehicle, and an upper limit value of a jerk of the vehicle to be smaller than when it is determined that the shift range is not switched such that the vehicle travels in the changed traveling direction.

5. The vehicle controller according to claim 1, wherein the at least one electronic control unit is configured to:
   detect an obstacle existing in the changed traveling direction; and
   limit the driving force of the vehicle based on a distance between the vehicle and the obstacle.

* * * * *